June 9, 1964  H. NEWPORT  3,136,131
SYNCHRONIZING AND SPEED CONTROL DEVICES
Filed Nov. 16, 1961
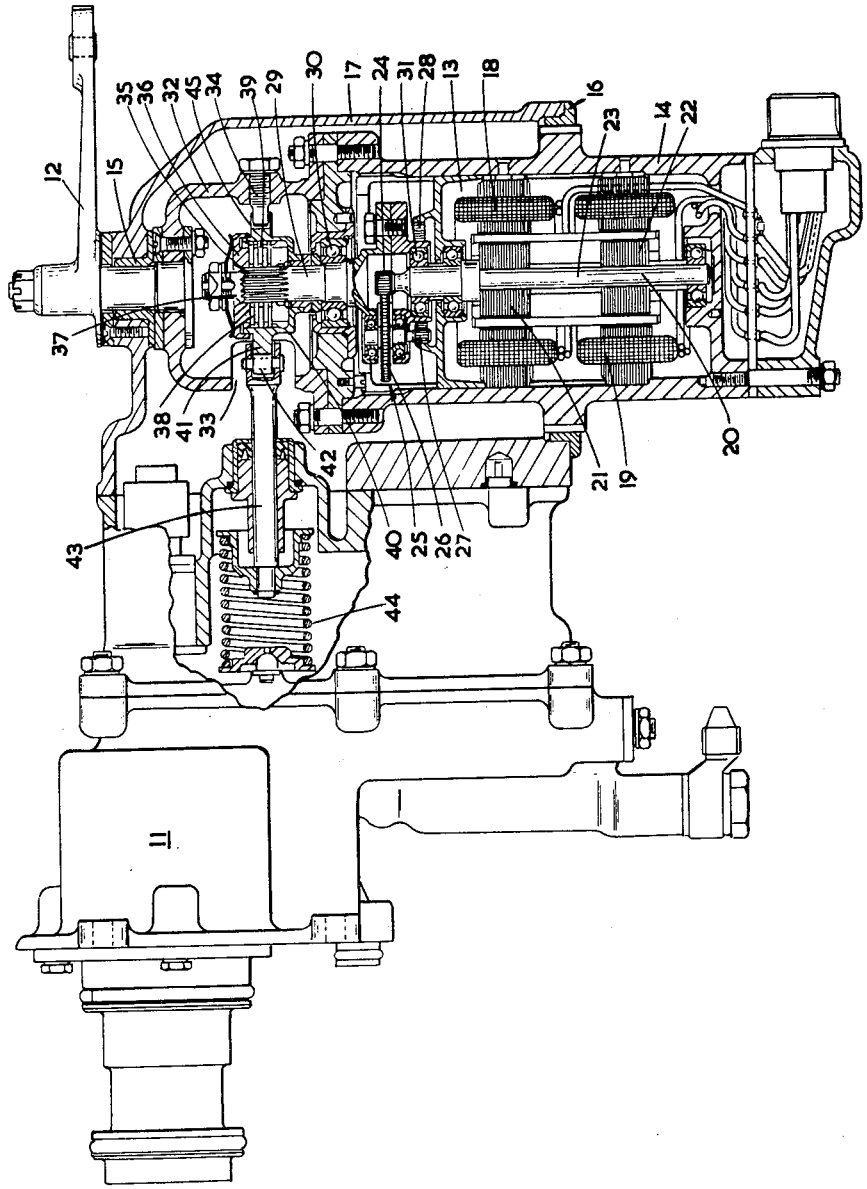
INVENTOR
HERBERT NEWPORT United States Patent Office 3,136,131
Patented June 9, 1964

3,136,131
SYNCHRONIZING AND SPEED CONTROL
DEVICES
Herbert Newport, The Highlands, Painswick, England, assignor to Dowty Rotol Limited, Cheltenham, England
Filed Nov. 16, 1961, Ser. No. 152,822
Claims priority, application Great Britain Nov. 21, 1960
4 Claims. (Cl. 60—102)

This invention relates to so-called synchronizing systems. Such a system is intended for use with two or more devices, one of which is usually regarded as a "master" device and each other of which is usually regarded as a "slave" device, in which the slave devices are arranged by suitable means controlling their operation to have a predetermined relationship at all instants of time to the master device during their operation. If that predetermined relationship is not maintained between the master device and a slave device, such a system operates upon that slave device to restore that predetermined relationship between the two devices.

Such a synchronizing system can be usefully employed with two or more gas turbine engines which are required, at any instant of time, to have identical speeds. In such an application, the synchronizing system can control the delivery of fuel to the combustion chambers of the slave engine or engines.

It is known to utilize in a synchronizing system a dynamo-electric machine associated with the master device and a slave device which operates when a predetermined relationship between the two devices is no longer maintained, to adjust the operation of the slave device until the predetermined relationship is restored. Such a dynamo-electric machine comprises two rotor windings wound upon a common shaft and two corresponding stator windings. One stator winding is supplied with polyphase alternating current from a generator driven by the master device, while the other stator winding is supplied with polyphase alternating current from a generator driven by a slave device. The shaft of the dynamo-electric machine is stationary when the speeds of the master device and the slave device are identical, but rotates when the speeds differ, because the frequencies of the two polyphase alternating currents now differ. Rotation of the shaft causes the speed of the slave device to be increased or decreased, as the case may be, until there is again speed synchronism. The shaft then stops rotating. Such a dynamo-electric machine is hereinafter referred as to "a dynamo-electric machine of the type described."

According to the invention, a synchronizing system for two devices (one of which can be regarded as a master device and the other of which can be regarded as a slave device), each having its own controlling member, includes means for setting the controlling members of both devices in such positions that they are capable of operating in a predetermined relationship, and a dynamo-electric machine of the type described, the shaft of which is movable in consequence upon a change from said predetermined relationship to adjust the setting of the controlling member of one device to a position in which the predetermined relationship is attained.

According to a feature of the invention, the system is arranged so that when the means for setting the controlling member of the said one device is moved, it does not cause movement of the shaft of the dynamo-electric machine, and so that when the shaft of the dynamo-electric machine moves to adjust the setting of the controlling member it does not cause movement of the means for setting the controlling member.

Conveniently, the dynamo-electric machine can be housed within the body of the means for setting the controlling member, and this provides a compact arrangement.

When more than one slave device is required to be synchronized with a master device, a dynamo-electric machine is provided for each slave device. Further means may be provided whereby, selectively, a device originally chosen to be a master device may be caused to operate as a slave device and a device originally chosen to be a slave device caused to operate as a master device. Under these circumstances it is necessary to provide each of the devices with a dynamo-electric machine, but only those dynamo-electric machines associated with the devices then acting as slaves will be operative and the dynamo-electric machine associated with the device then acting as a master device will not be operative.

One embodiment of the invention as applied to the fuel system of a gas turbine engine forming part of a multi-gas-turbine engine installation will now be particularly described with reference to the accompanying drawing. The fuel system, part of which is shown at 11 in the drawing, is so arranged that it requires the operation of a single setting means or input lever, 12, to adjust the fuel flow to the combustion chambers (not shown) of the engine. This lever 12 effectively includes a dynamo-electric machine 13 of the type described forming an integral part of it. The body 14 of the dynamo-electric machine is supported for rotation in suitable bearings 15 and 16 carried by the casing 17 of the part 11 of the fuel system. The dynamo-electric machine is provided with two stator windings 18 and 19 of which one may be supplied with alternating current at a frequency corresponding to the speed of rotation of the engine with which the fuel system is associated, and of which the other winding may be supplied with alternating current at a frequency corresponding to the speed of rotation of another gas turbine engine of the installation. The latter engine may be regarded as the master, providing a speed reference and the engine controlled by the lever 12, now being described, can be regarded as the slave engine. The rotor 20 of the dynamo-electric machine comprises two rotor windings 21 and 22 wound upon a common shaft 23, these windings respectively corresponding with the stator windings 18 and 19.

The rotor 20 tends to move in a manner corresponding to any difference occurring between the two frequencies of the alternating currents supplied to the stator windings.

The rotational axis of the common shaft 23 is co-incident with the rotational axis of the lever 12, and the end portion of the common shaft 23 is provided with a pinion 24 which is the input gear of a differential reduction gearing generally shown at 25, and which also comprises gear wheels as at 26, pinions as at 27, and an internally-toothed peripheral gear 28. In a manner well known in the art of differential reduction gearing the pinion 24 meshes with the gear wheels 26, and the pinions 27, which are mounted on the same shafts as the gear wheels 26, mesh with the peripheral gear 28. The gear wheels 26 and pinions 27 are mounted for rotation in bearings carried by an output member 29. The rotational axis of the output member 29 is also co-incident with the rotational axis of the lever 12 and of the common shaft 23, the member 29 being mounted for rotation in ball bearings 30 and 31.

The body 14 of the dynamo-electric machine 13 is connected to the lever 12 through the intermediary of a flanged cylindrical member 32 formed with an aperture 33 in its wall. At a position in this wall substantially diametrically opposite to the aperture 33 there is provided a pin 34 which projects radially inwardly of the cylindrical member 32.

The output member 29 of the dynamo-electric machine 13 is provided with a splined end portion 35. This splined end portion 35 carries one member 36 of a spring-loaded clutch 37. The spring-loaded clutch 37 comprises a number of inter-engaging discs 38, alternate ones of which are a splined fit at 39 into a clutch output member 40. The member 40 is provided with an external cam 41 which engages a roller 42 carried by a controlling member in the form of a forked input rod 43 for the fuel system, this rod being biassed by a coil spring 44 such that the roller 42 is held in engagement with the cam 41.

It will be understood that reciprocatory movement of the rod 43 effects adjustment in the fuel supply to the associated engine.

The pin 34 is arranged to engage a slot 45 formed in the cam 41, a certain predetermined amount of lost motion being provided between the pin and the slot, this affording stops to limit the amount of movement which the dynamo-electric machine is permitted to apply upon the cam.

Upon angular displacement of the lever 12 about its axis of rotation, the cam 41 is rotated through the intermediary of the member 32 and the peg 34 to adjust the fuel flow to the engine. Operation of the dynamo-electric machine for synchronizing purposes causes a further adjustment to be made upon the setting of the rod 43 and the extent of this superimposed adjustment upon the effective setting of the lever 12, is limited by the lost motion between the peg 34 and the slot 45. If the amount of lost motion is exceeded, slipping of the clutch occurs upon engagement of the stops formed by the slot. In the embodiment being described the extent of adjustment in terms of revolutions per minute of the engine is ±250.

It will be understood that each of the input levers for the other slave engines of the installation are similarly provided with dynamo-electric machines. When the engines are all running together at the same throttle setting with the engines in speed synchronism, the rotors 20 of all the dynamo-electric machines will be stationary. If, however, the speed of a slave engine increases such that it is no longer in synchronism with the master engine and the other slave engines, then the difference in frequency of the alternating current transmitted to the windings of the respective dynamo-electric machine will be such as to cause rotation of the rotor of that dynamo-electric machine and in consequence rotation of the output member 29. Hence the associated cam 41 is rotated in a direction such that the fuel flow to the respective slave engine is sufficiently decreased to bring that engine back into synchronism with the master engine.

If, conversely, the speed of a slave engine decreases such that it is no longer in synchronism with the master engine, then the cam 41 is rotated in the opposite direction such that the fuel flow to the respective slave engine is sufficiently increased to bring that engine back into speed synchronism with the master engine.

By so arranging that the dynamo-electric machine forms part of the input lever 12, and by so arranging that the axis of the output member 29 of the machine is coincident with the rotational axis of the lever 12, a very compact construction is achieved and no provision is required for separate mounting of the dynamo-electric machine.

The invention is in no way limited to pivotal mounting of the input lever 12. For example, in an alternative embodiment, the lever is mounted for reciprocatory movement in suitable bearings, and the output member of the dynamo-electric machine, includes a pinion which meshes with a rack member for effecting adjustments and superimposed adjustments upon a fuel flow control system.

I claim as my invention:

1. In combination with a pair of devices each operable as a function of a predetermined variable, control means operable to impart a predetermined value to such variable in the case of one device, means rotatable about an axis to cause an adjustment in the value imposed on said one device by the control means, dynamoelectric means operable to maintain a predetermined relationship between said devices with respect to the variable, said dynamo-electric means including an output member that is mounted on said axis to turn in response to a deviation from said relationship, slip clutch means operatively connecting the output member and the adjustment means for conjoint rotation, and means movable about said axis to position the adjustment means at a predetermined setting, said positioning means having a lost motion connection with the adjustment means so as to allow for movement of the adjustment means caused by the dynamoelectric output member.

2. The combination according to claim 1 wherein the adjustment means includes a cam connection between the clutch means and the control means.

3. A synchronizing system which is designed to synchronize a master device and a slave device, each device having its own controlling member, said system including in combination: a first angularly adjustable means, for setting the controlling member of the master device, and a second angularly adjustable means for setting the controlling member of the slave device, in such positions that the devices are capable of operating in a predetermined relationship; a dynamoelectric machine having a rotatable shaft, which machine is housed within the body of the second angularly adjustable means and which is also associated with the devices in a manner so as to be operable, when the predetermined relationship is no longer maintained, for effecting adjustment of the setting of the controlling member of the slave device to a position in which the predetermined relationship is attained; and a mounting for the body of the second angularly adjustable means, so aranged that this means is adjustable about a rotational axis which is coincident with the axis of rotation of the shaft of the dynamoelectric machine.

4. A synchronizing system as claimed in claim 3, wherein the said second angularly adjustable means includes a cam which engages the controlling member of the slave device and wherein the dynamoelectric machine is connected through a clutch with the cam.

References Cited in the file of this patent
UNITED STATES PATENTS

| | | |
|---|---|---|
| 1,350,446 | Fynn | Aug. 24, 1920 |
| 2,084,800 | Gartner | June 22, 1937 |